(12) United States Patent
Tamura

(10) Patent No.: US 8,379,274 B2
(45) Date of Patent: Feb. 19, 2013

(54) IMAGE PROCESSING APPARATUS AND ITS METHOD

(75) Inventor: Hirokazu Tamura, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 11/846,892

(22) Filed: Aug. 29, 2007

(65) Prior Publication Data

US 2008/0055654 A1    Mar. 6, 2008

(30) Foreign Application Priority Data

Sep. 1, 2006    (JP) .................................. 2006-238172

(51) Int. Cl.
*G06T 5/00*    (2006.01)
*H04N 1/407*   (2006.01)
*G06K 9/40*    (2006.01)

(52) U.S. Cl. ...... 358/3.27; 358/1.9; 358/3.06; 358/3.26; 358/532; 358/533; 382/254; 382/266

(58) Field of Classification Search .................. 358/1.9, 358/3.226–3.27, 532–533; 382/254–275
See application file for complete search history.

(56) References Cited

U.S. PATENT DOCUMENTS

| | | | | |
|---|---|---|---|---|
| 5,384,900 A | | 1/1995 | Sato et al. ...................... 395/100 |
| 5,402,530 A | * | 3/1995 | Boenke et al. ................ 358/1.13 |
| 5,581,667 A | * | 12/1996 | Bloomberg .................... 358/1.9 |
| 5,642,124 A | | 6/1997 | Kawai et al. ...................... 345/2 |
| 5,687,303 A | * | 11/1997 | Motamed et al. ............. 358/1.18 |
| 6,192,152 B1 | * | 2/2001 | Funada et al. ................. 382/199 |
| 6,263,100 B1 | | 7/2001 | Oshino et al. ................. 382/154 |
| 6,297,889 B1 | * | 10/2001 | Loce et al. ...................... 358/1.9 |
| 6,341,020 B1 | * | 1/2002 | Rumph et al. .................. 358/1.9 |
| 6,345,117 B2 | * | 2/2002 | Klassen ......................... 382/167 |
| 6,628,820 B2 | | 9/2003 | Oshino et al. ................. 382/154 |
| 6,628,842 B1 | * | 9/2003 | Nagao ........................... 382/266 |
| 7,085,009 B2 | * | 8/2006 | Kawai et al. .................... 358/1.9 |
| 7,092,124 B2 | * | 8/2006 | Nabeshima et al. ........... 358/1.9 |
| 7,116,821 B2 | * | 10/2006 | Lane et al. ..................... 382/178 |
| 7,123,381 B2 | | 10/2006 | Klassen ......................... 358/1.9 |
| 7,139,098 B2 | | 11/2006 | Klassen ......................... 358/1.9 |

FOREIGN PATENT DOCUMENTS

| | | |
|---|---|---|
| JP | 8-237472 | 9/1996 |
| JP | 2000-165693 | 6/2000 |

OTHER PUBLICATIONS

Chen et al, "Contrast-Based Color Image Segmentation", IEEE Signal Processing Letters, vol. 11, No. 7, Jul. 2004.*

* cited by examiner

*Primary Examiner* — Richard Zhu

(74) *Attorney, Agent, or Firm* — Fitzpatrick, Cella, Harper & Scinto

(57) ABSTRACT

An unnatural color change which occurs when combining trapping and spatial filter processing is suppressed. When image data is input, it is determined whether to perform trapping at the position of the pixel of interest of the input image data, and trapping is performed for the input image data. In addition, spatial filter processing is performed for the pixel of interest of the input data, an output of the trapping and that of the filter processing are weighted, and image data to be output is calculated.

6 Claims, 15 Drawing Sheets

PRIOR ART
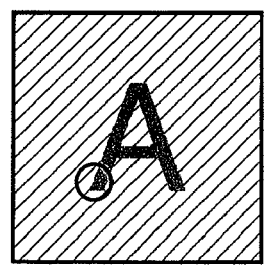
F I G. 1A
EDGE ENHANCEMENT

PRIOR ART

EDGE ENHANCEMENT

MISREGISTRATION

MISREGISTRATION

PRIOR ART

TRAPPING →

PRIOR ART

EDGE ENHANCEMENT ↓

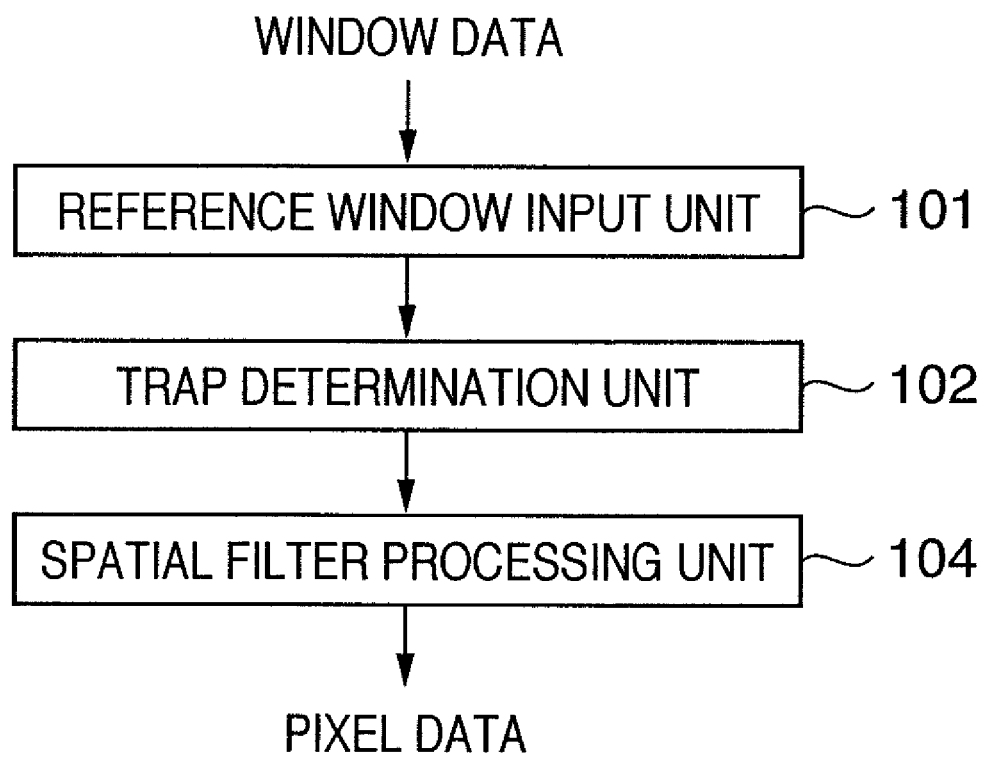
F I G. 14

IMAGE PROCESSING APPARATUS AND ITS METHOD

BACKGROUND OF THE INVENTION

1. Field of the Invention

The present invention relates to trapping which prevents exposure of a background color caused by misregistration.

2. Description of the Related Art

In printing a color image, a given color is presented by superposing a plurality of colors, for example, the four colors cyan C, magenta M, yellow Y, and black K, which are known as process colors. The colors have a potential misregistration problem. In the boundary of the different process colors, even when the width of the boundary is ideally zero, exposure (to be referred to as a blank portion, hereinafter) of the white color of the background paper sheet or of unnatural artifacts occurs due to misregistration. This misregistration almost always arises from mechanical problems in a print system.

As a technique called trapping for correcting misregistration is known. In a general approach, a gap between colors or a boundary position of misregistration is detected, and the region of one color is extended to overlap the region of the other color so that adverse visual effects after printing are minimized.

One flaw of trapping is that the color changes in the overlap region (generally corresponding to the edge portion of an image) of different colors. Therefore, misregistration tolerance and color change are in a trade-off relationship.

Japanese Patent Laid-Open No. 2000-165693 discloses a technique of minimizing the adverse visual effects of overlap regions. This technique determines whether to perform trapping by converting a color into a color based on human perception or determines the color to undergo region extension and implements trapping with fewer adverse visual effects.

On the other hand, an edge operation such as an edge enhancement process is sometimes performed on the edge portion of an image. That is, a printing apparatus also has a spatial filter processing function. An edge enhancement process is sometimes performed not only to a picture image and a scan image but also to objects such as text, lines, and figures.

Japanese Patent Laid-Open No. 8-237472 discloses a technique which applies filter processing to trapping. This technique applies a softening filter and mask process to a portion to be trapped (a portion in which a blank portion is likely to appear due to misregistration) in order to prevent the blank portion. However, a blank portion caused by misregistration is more clearly noticeable in an edge-enhanced image rather than in an image which does not undergo edge enhancement.

FIGS. 1A to 1C are views showing an example of a text image (density of 80%) with a sharp edge in a light background (density of 10%).

When the image shown in FIG. 1A undergoes edge enhancement, the density of the text image in the edge portion increases and that of the background decreases as shown in FIGS. 1B and 1C. As a result, the edge portion of the image is well-defined.

FIGS. 2A to 2E are views showing an example of an image formed with a plurality of colors. For example, a text image is formed with the color K in a light background and the periphery of the text image is colored with the color M.

When the image shown in FIG. 2A undergoes edge enhancement, the density of the edge portions of colors K and M increase and that of the background of the edge portions decreases as shown in FIGS. 2B and 2C. When misregistration occurs, a clear blank portion appears as shown in FIG. 2E, as compared with a case shown in FIG. 2D wherein no edge enhancement is performed.

FIGS. 3A to 3D are views showing a case wherein edge enhancement is performed for the edge of an image which underwent trapping.

When trapping is performed for the image shown in FIG. 3A, as shown in FIGS. 3B and 3C, the colors overlap with each other in the trap width and an edge which does not exist in the original image appears. When edge enhancement is performed for this image, as shown in FIG. 3D, no blank portion appears but an unnatural stripe-patterned color change, which does not exist in the original image, occurs in the edge portion. Note that the same problem arises even when the processing order is reversed, that is, even when the edge-enhanced image undergoes trapping.

Such a potential problem exists because whether to perform edge enhancement is not considered in the post processing or preprocessing of trapping.

Since both of spatial filter processing and trapping are generally performed for each window, in order to obtain a satisfactory processing result, it is necessary to buffer an image for a plurality of lines. Accordingly, a processing system which performs both spatial filter processing and trapping must have independent line memories for respective processings, and this leads to an increase in memory cost.

SUMMARY OF THE INVENTION

In one aspect, a method of processing an image inputs image data, determines whether to perform trapping at a position of a pixel of interest of the input image data, performs trapping for the input image data, performs spatial filter processing for a pixel of interest of the input image data, and weights an output of the trapping and an output of the filter processing and calculating image data to be output.

According to the aspect, an unnatural color change which occurs when trapping and spatial filter processing are combined can be suppressed. In addition, trapping and color spatial filter processing can share a memory, and thereby an increase in the cost of memory can be prevented.

Further features of the present invention will become apparent from the following description of exemplary embodiments with reference to the attached drawings.

BRIEF DESCRIPTION OF THE DRAWINGS

FIGS. 1A to 1C are views showing an example of a text image with a sharp edge in a light background;

FIG. 14 is a block diagram showing still another structure of the trap/filter processing unit which smoothes a pixel position determined to be trapped.

DESCRIPTION OF THE EMBODIMENTS

Image processes of embodiments according to the present invention will be described below in detail with reference to the accompanying drawings. Note that in the following description, a digital multifunction device is assumed as an image forming apparatus. However, other printing devices such as a color copying machine and color printer can be used in the same manner.

First Embodiment

[Structure of Image Forming Apparatus]

Figure 1B:
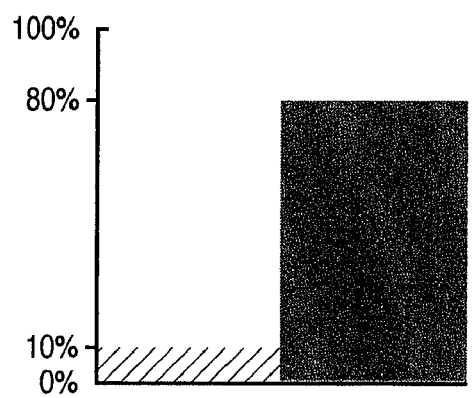
Figure 1C:
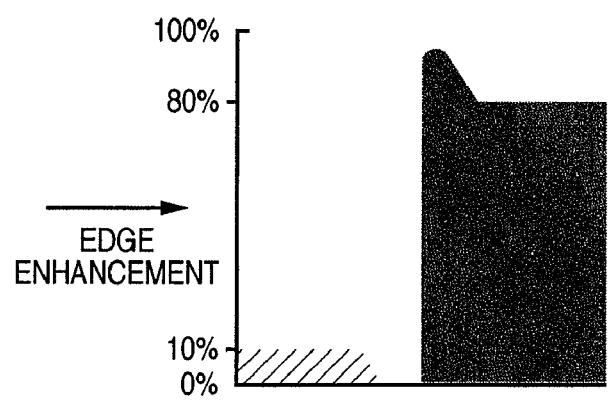
Figure 2A:
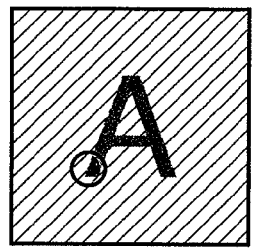
FIGS. 2A to 2E are views showing an example of an image formed with a plurality of colors.
Figure 2B:
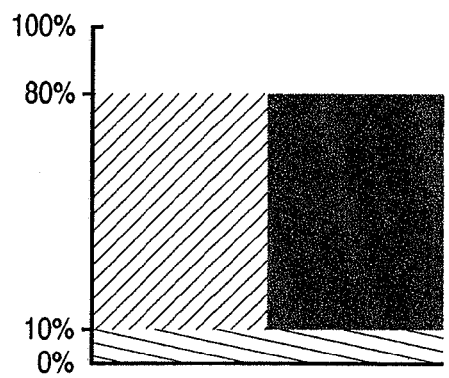
Figure 2C:
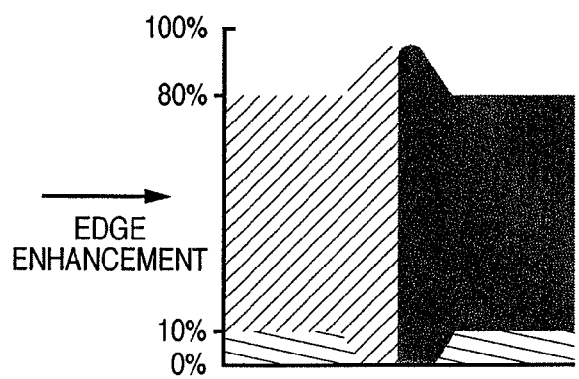
Figure 2D:
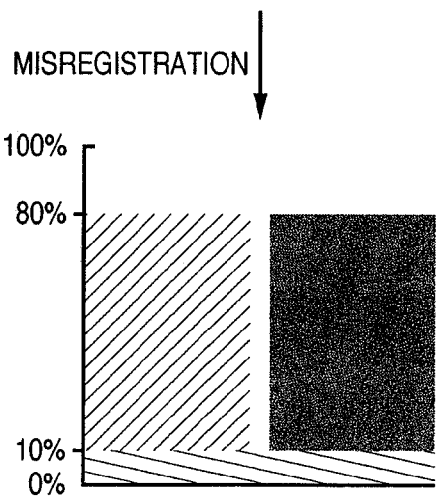
Figure 2E:
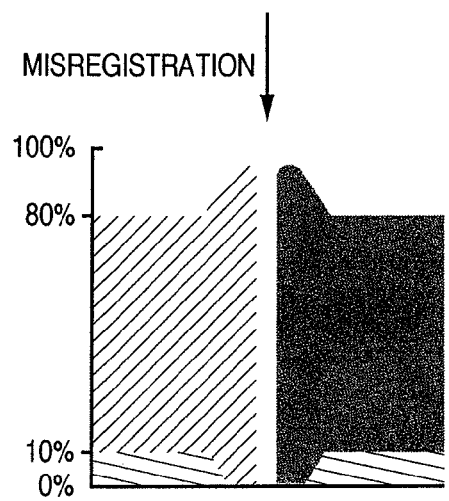
Figure 3A:
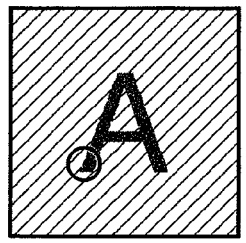
FIGS. 3A to 3D are views showing a case wherein edge enhancement is performed for the edge of an image which underwent trapping.
Figure 3B:
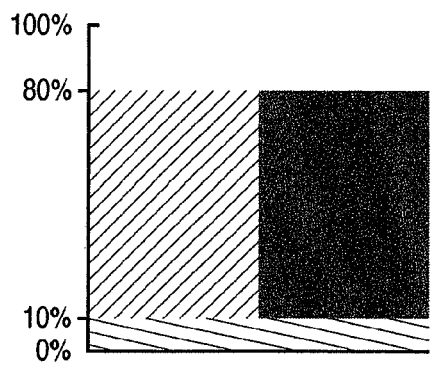
Figure 3C:
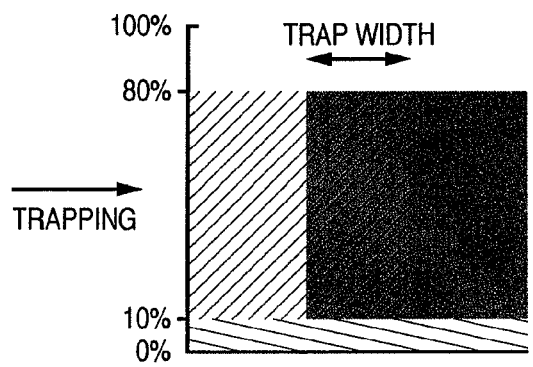
Figure 3D:
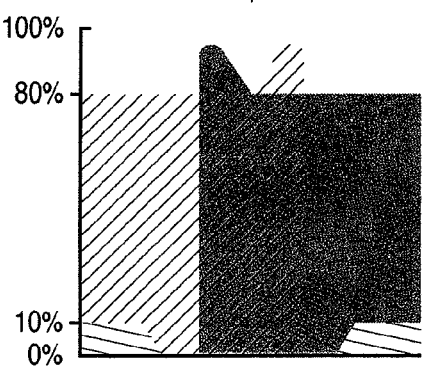
Figure 4:
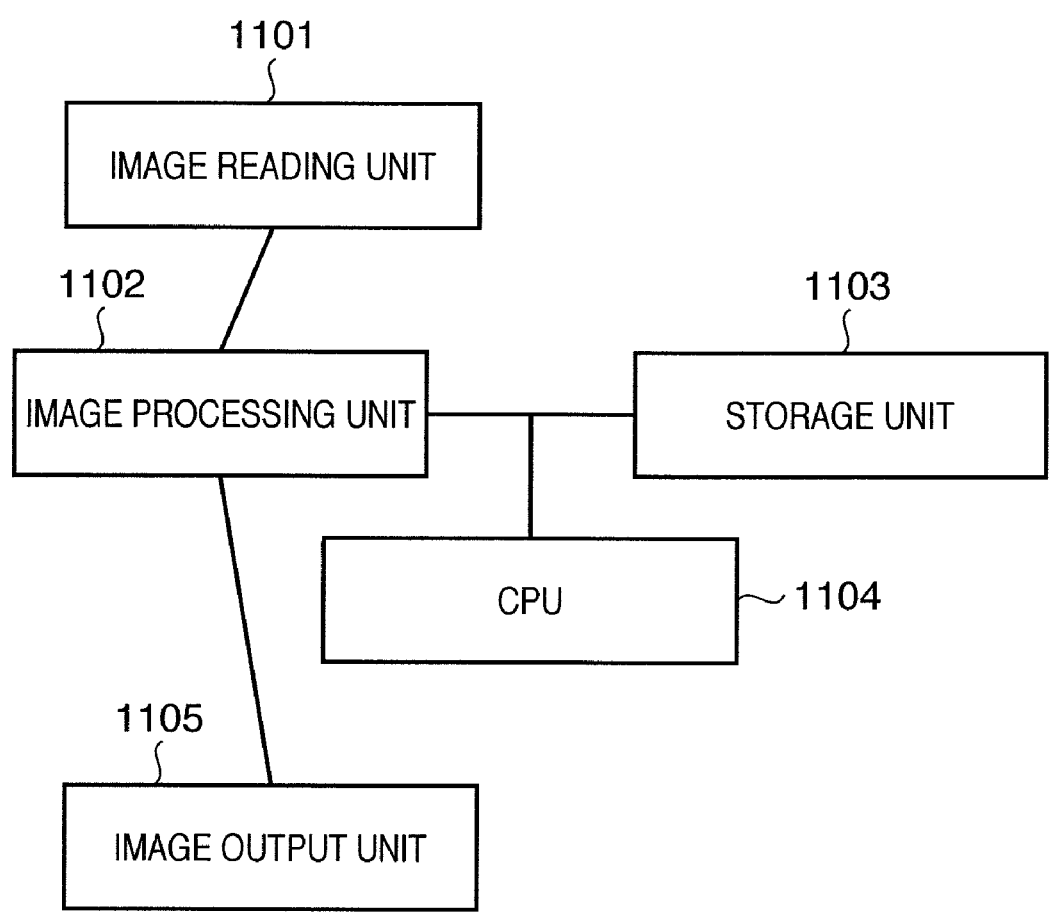
FIG. 4 is a block diagram showing the structure of an image forming apparatus of an embodiment.

FIG. 4 is a block diagram showing the structure of an image forming apparatus of an embodiment of the present invention.

As shown in FIG. 4, the image forming apparatus comprises an image reading unit 1101, an image processing unit 1102, a storage unit 1103, a microcontroller (CPU) 1104, and an image output unit 1105. Note that the image forming apparatus can connect to a server which manages image data, a personal computer (PC) which indicates a print execution, and the like via a network or the like.

The image reading unit 1101 reads a document image and outputs image data.

The image processing unit 1102 converts print information including image data input from the image reading unit 1101 or an external device into intermediate information (to be referred to as an "object", hereinafter) and stores it in an object buffer of the storage unit 1103. At this time, the image processing unit 1102 performs an image process such as density correction. In addition, the image processing unit 1102 generates bitmap data based on the buffered object and stores it in a band buffer of the storage unit 1103. At this time, the image processing unit 1102 performs a halftone process such as dithering.

Trapping is performed in two manners; in other words, trapping is performed in raster image processing based on an object or is performed on bitmap data after rendering. In the following description it is mainly assumed that trapping is performed on bitmap data after rendering.

The storage unit 1103 includes a read-only memory (ROM), a random access memory (RAM), a hard disk (HD), and the like. The ROM stores various types of control programs and image processing programs to be executed by the CPU 1104. The CPU 1104 uses the RAM as a reference area and work area to store data and various kinds of information. The RAM and HD are used as the above-described object buffer, band buffer, and the like.

The image output unit 1105 forms and outputs a color image on a printing medium such as a printing sheet.

[Apparatus Outline]

Figure 5:
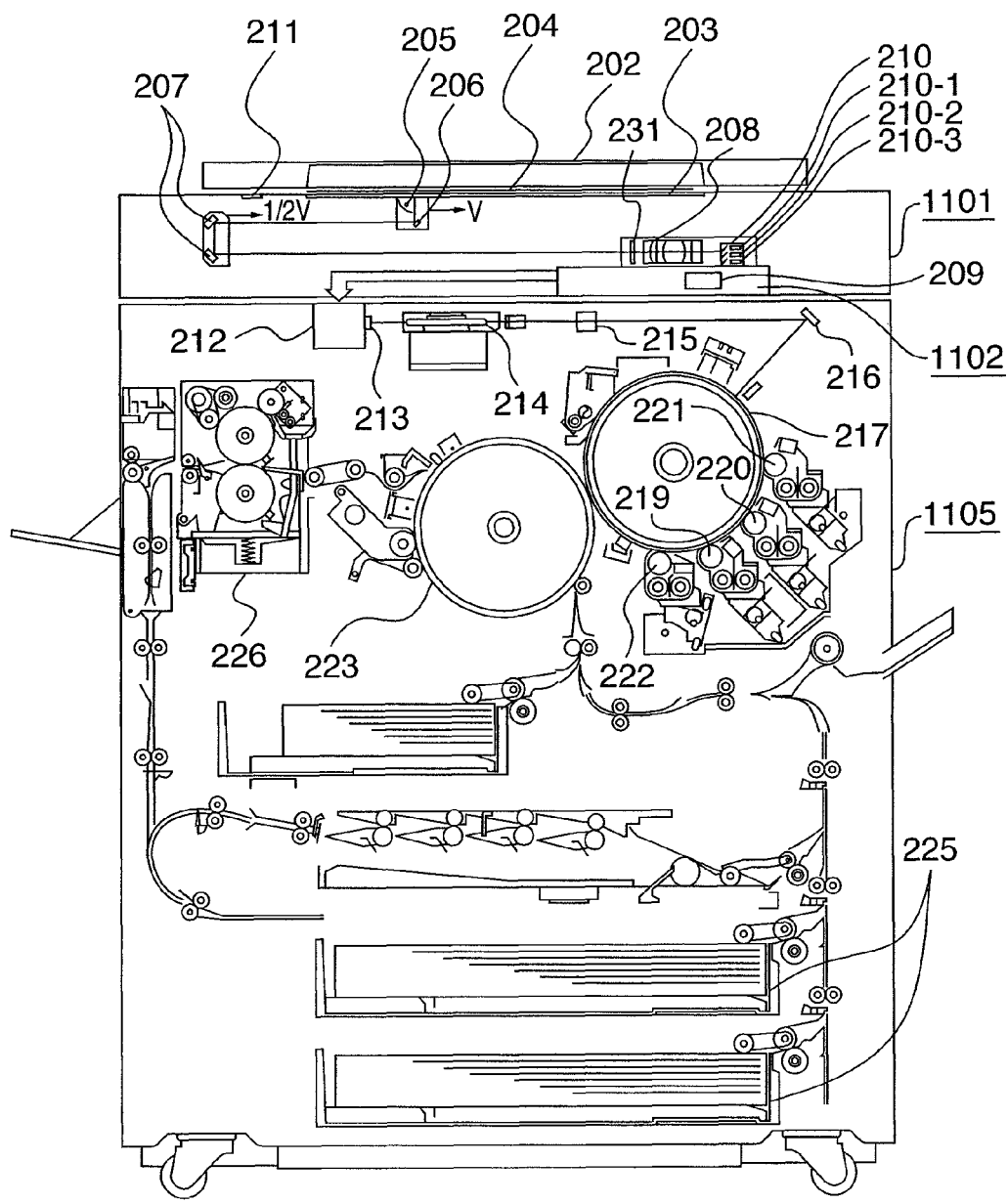
FIG. 5 is view showing an outline of the image forming apparatus.

FIG. 5 is a view showing an outline of the image forming apparatus.

In the image reading unit 1101, a document sheet 204 the image of which is to be read is placed between a glass document table 203 and a document platen 202, and the document sheet 204 is irradiated with light from a lamp 205. The reflected light from the document sheet 204 is directed to mirrors 206 and 207, and an image is formed on a three-line sensor 210 by a lens 208. The lens 208 includes an infrared cut filter 231. A motor (not shown) moves a mirror unit including the mirror 206 and lamp 205 at a speed V and a mirror unit including the mirror 207 at a speed V/2 in the direction indicated by the arrows. More specifically, the mirror units move in the vertical direction (sub-scanning direction) with respect to the electric scanning direction (main scanning direction) of the three-line sensor 210 to scan the whole surface of the document sheet 204.

The three-line sensor 210 including three lines of charge coupled devices (CCDs) color-separates input light information, reads respective color components of full-color information red R, green G, and blue B, and sends them to a signal processing unit 209. Note that each of the CCDs included in the three-line sensor 210 has photoreceptors corresponding to 5000 pixels so that it can read the lateral direction (297 mm) of a document sheet of size A3, which is the maximum size of the document sheet to be placed on the glass document table 203, with a resolution of 400 dpi.

A standard white plate 211 is used to correct data read by CCDs 210-1 to 210-3 of the three-line sensor 210. The standard white plate 211 is a white plate which shows almost uniform reflection characteristics with visible light.

The image processing unit 1102 electrically processes an image signal input from the three-line sensor 210, generates respective color signals of magenta M, cyan C, yellow Y, and black K, and sends the generated color signals to the image output unit 1105. For one document scan by the image scanner unit 201, one of the M, C, Y and K color signals is sent to the image output unit 1105, and one printout is completed by four document scans in total.

The image output unit 1105 sends the M, C, Y, or K image signal sent from the image reading unit 1101 to a laser driver 212. The laser driver 212 drives a semiconductor laser element 213 by modulation in accordance with the input image signal. A laser beam output from the semiconductor laser element 213 scans a photosensitive drum 217 via a polygon mirror 214, an f-θ lens 215, and a mirror 216 to form an electrostatic latent image on the photosensitive drum 217.

A developer is formed of a magenta developer 219, a cyan developer 220, a yellow developer 221, and a black developer 222. When the four developers alternately contact the photosensitive drum 217, an electrostatic latent image formed on the photosensitive drum 217 is developed using toner of the corresponding color, thereby forming a toner image. A printing paper sheet supplied from a printing paper cassette 225 is wound around a transfer drum 223, and the toner image on the photosensitive drum 217 is transferred onto the printing paper sheet.

In this manner, a printing paper sheet on which the toner images of the four colors of M, C, Y, and K are sequentially transferred passes a fixing unit 226 to fix the toner images and is then delivered out of the apparatus.

[Edge Processing]

The procedure of edge processing by trapping and spatial filter processing will be described next. Note that a rendered color image including at least two colors is input to the edge processing. More specifically, it is a CMYK color raster image corresponding to the color space used in the signal processing of the image output unit 1105.

Figure 6:
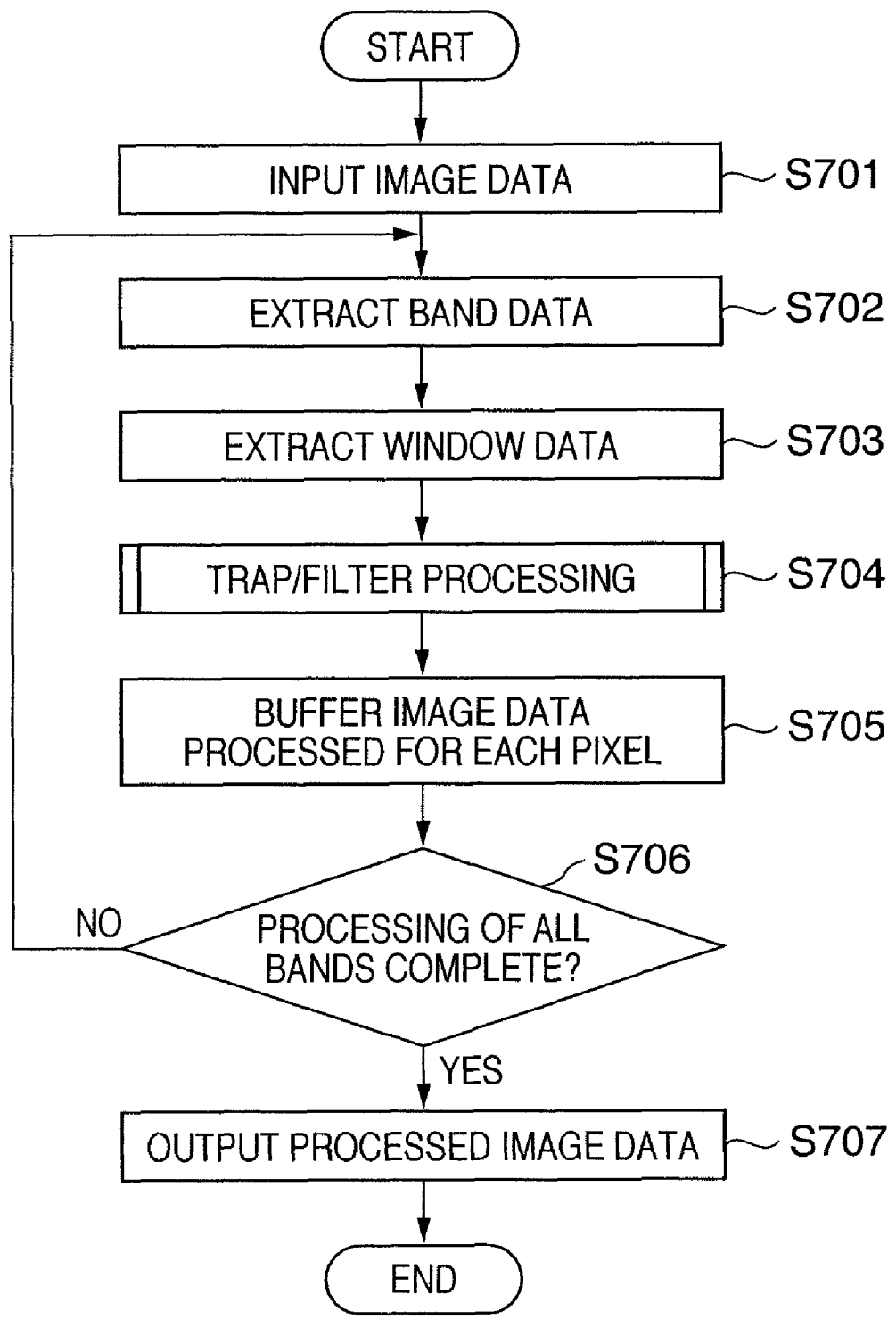
FIG. 6 is a flowchart for explaining edge processing.

FIG. 6 is a flowchart for explaining edge processing executed by the CPU 1104 and image processing unit 1102.

First, image data is input and stored in a buffer memory (S701). The image data (to be referred to as "band data", hereinafter) for the N-pixel width (to be referred to as a "band", hereinafter) is stored in a line buffer (S702). Note that the band width N depends on the size of a reference window (to be described later). The buffer memory and line buffer are allocated in the RAM of the storage unit 1103 or the hard disk (HD).

Image data (to be referred to as "window data", hereinafter) corresponding to N×N pixels (to be referred to as a "reference window", hereinafter) is extracted from the band data stored in the line buffer (S703) and is input to a trap/filter processing unit (S704). The image data which underwent trap/filter processing for each pixel is stored in the buffer memory (S705).

When the trap/filter processing of the band data is complete, it is determined if the processing for all bands is complete (S706). If NO in step S706, the process returns to step S702. Otherwise, the image data which underwent the trap/filter processing and has been stored in the buffer memory is output (S707).

Figure 7:
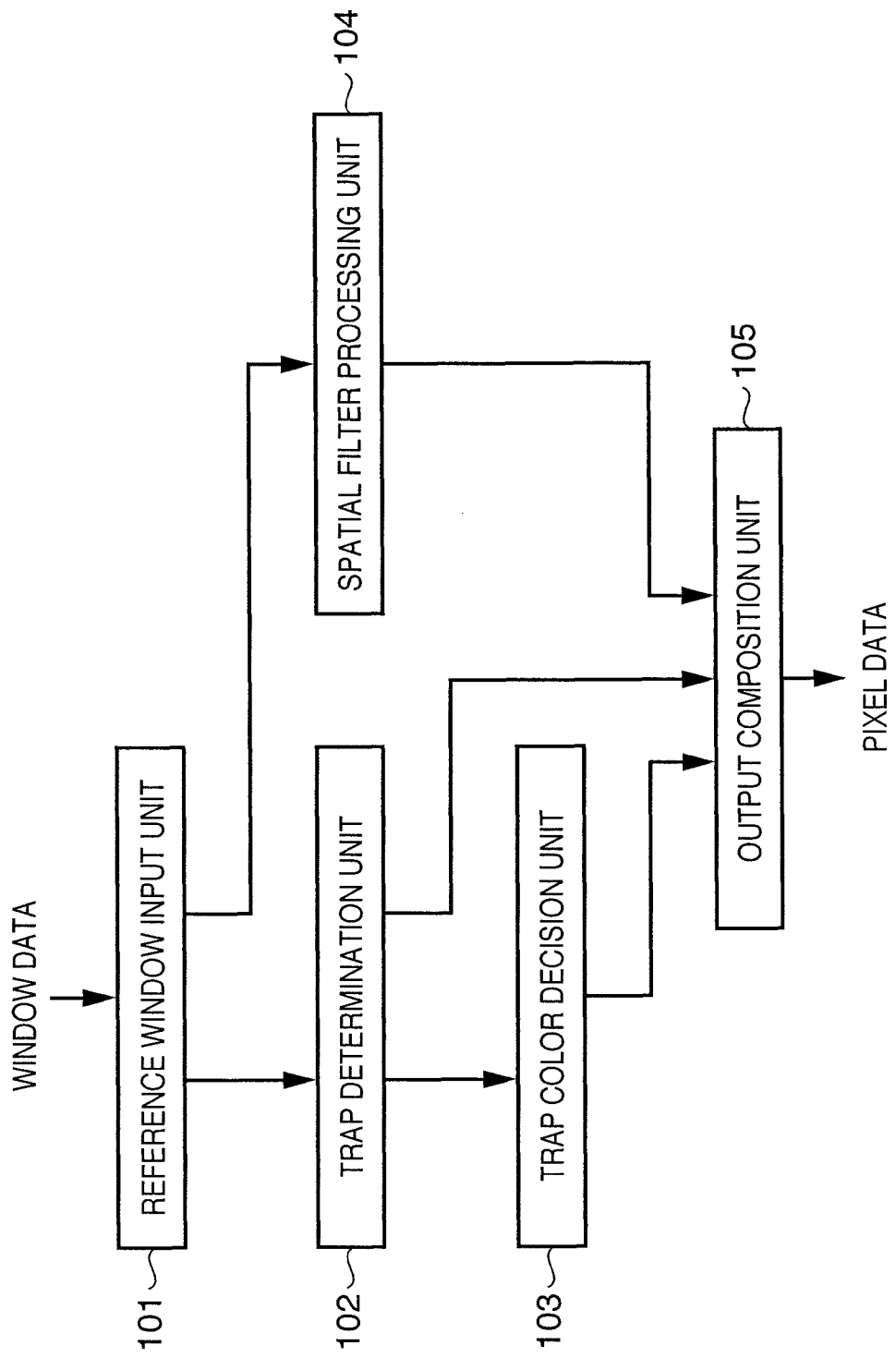
FIG. 7 is a block diagram showing the structure of a trap/filter processing unit.

FIG. 7 is a block diagram showing the structure of the trap/filter processing unit.

Data for each reference window is input to the trap/filter processing unit, as described above. Therefore, a reference window input unit 101 inputs window data.

A trap determination unit 102 checks (the details will be described later) the number of pixels (to be referred to as a "trap target pixels", hereinafter) to be trapped between a color (to be referred to as a "color of interest", hereinafter) which is to undergo determination as to whether to extend its region and the other reference color, and determines whether to perform trapping. This determination is performed for all combinations of the colors.

A trap color decision unit 103 decides (the details will be described later) the color (to be sometimes referred to as a "trap color", hereinafter) to undergo region extension, on the basis of the determination result of the trap determination unit 102.

A spatial filter processing unit 104 performs (the details will be described later) filter processing for each color of a reference window.

An output composition unit 105 selects and outputs one of a trap value or filter output value or a weighted composition value on the basis of a selected trap value, spatial filter output value, and determination result (S106).

Trap Determination Unit

Figure 8:
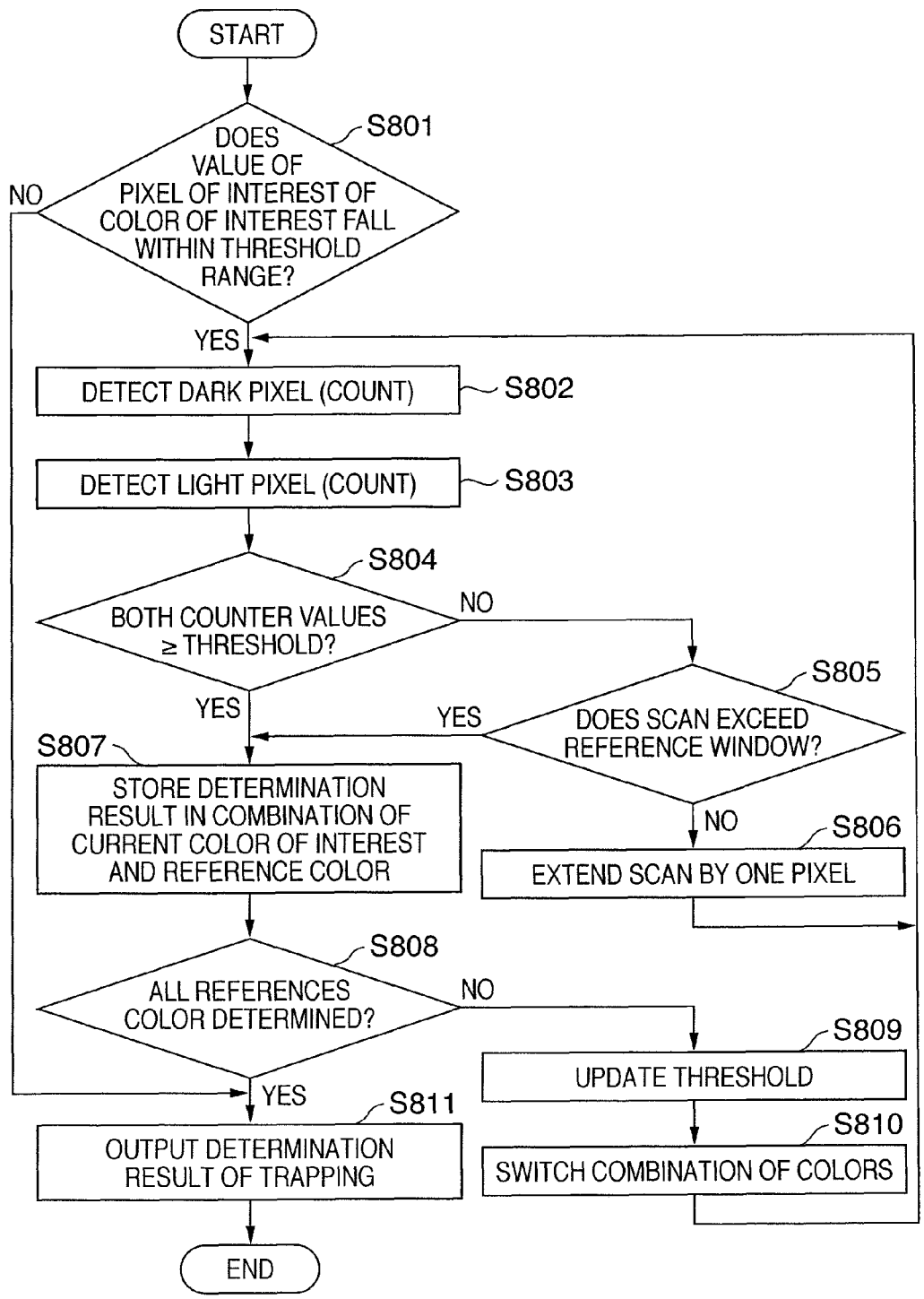
FIG. 8 is a flowchart for explaining the process of a trap determination unit.

FIG. 8 is a flowchart for explaining the process of the trap determination unit 102.

First, the trap determination unit 102 determines if the value of a pixel of interest as the center pixel of the reference window of a given color of interest falls within a certain threshold range (e.g., a low density pixel with a density of 0% to 15%) (step S801). When the value of the pixel of interest is large (the density is high and the value falls outside the threshold range), the trap determination unit 102 outputs a determination result (necessity degree, hereinafter) indicating that no trapping is required (S811), and thus ending the process of the reference window.

When the value of the pixel of interest falls within the threshold range, the trap determination unit 102 scans the surrounding pixels adjacent to the pixel of interest and counts a number NH of surrounding pixels with a dark color (e.g., pixels which have a density of 65% or greater so that their color can be recognized) in a combination of the color of interest and reference color (S802). The trap determination unit 102 also scans the surrounding pixels adjacent to the pixel of interest and counts a number NL of surrounding pixels with a light color (e.g., a color with a density of 10% or less which is substantially determined as white) in a combination of the color of interest and reference color (S803). The respective count values undergo threshold processing (S804).

When both of the count values NH and NL are equal to or larger than a predetermined value, the process advances to step S807. The threshold for determination in step S804 will be described later.

When both of the count values NH and NL are smaller than the predetermined value, the trap determination unit 102 determines if the scan exceeds the reference window when the positions of the surrounding pixels to be scanned are outwardly shifted by one pixel from the pixel of interest (S805). If NO in step S805, the positions of the surrounding pixels to be scanned are outwardly shifted by one pixel from the pixel of interest (S806), and the process returns to step S802. If YES in step S805, the process advances to step S807.

The trap determination unit 102 stores the necessity degree in the combination of the color of interest and reference color (S807). More specifically, when both of the count values NH and NL become greater than or equal to the predetermined value in any scan, the trap determination unit 102 stores the necessity degree which indicates that trapping is to be performed for that particular combination of the colors. When the scan exceeds the reference window, the trap determination unit 102 stores the necessity degree which indicates that no trapping is to be performed.

Figure 9A:
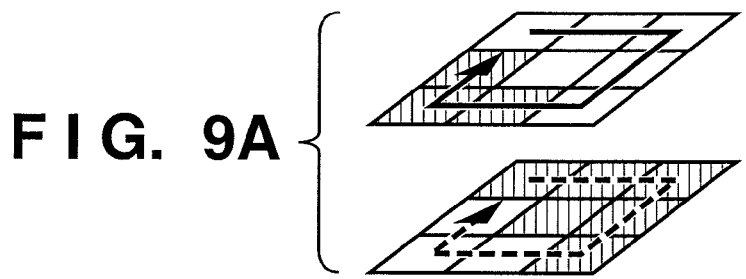
FIGS. 9A to 9C are views illustrating a scan procedure.
Figure 9B:
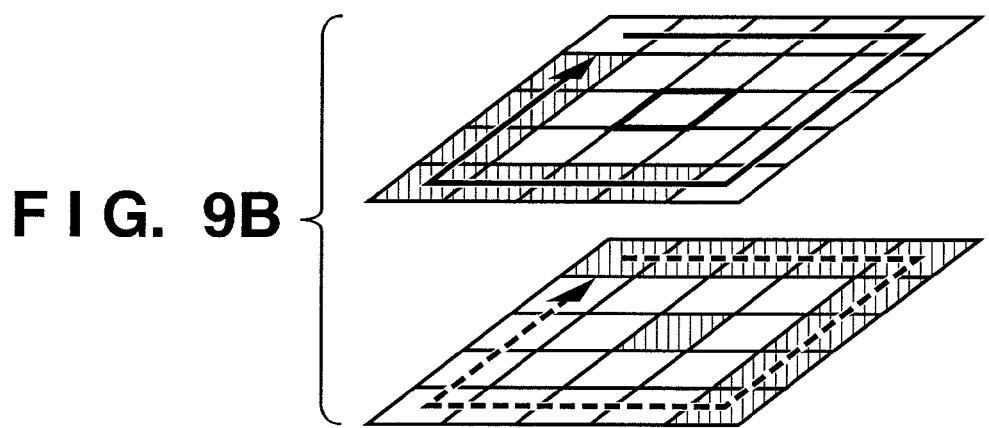
Figure 9C:
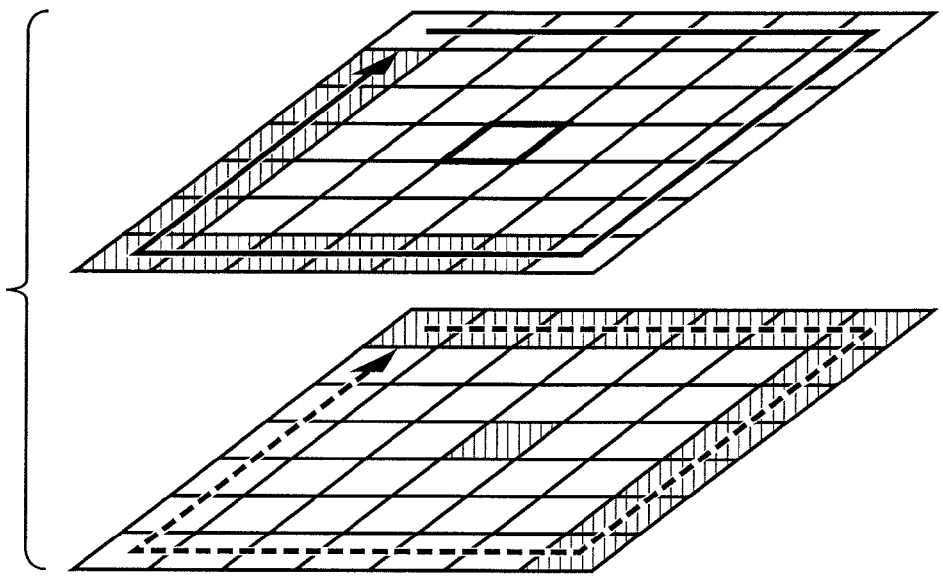

FIG. 9A to 9C are views illustrating the scan procedure, which illustrate scans with a round length corresponding to one, two and three pixels, respectively. In this manner, the round length is extended until the scan reaches the reference window size.

Next, the trap determination unit 102 determines if the process from steps S802 to S807 has completed for the combinations of the color of interest and all the reference colors (S808). If YES in step S808, the necessity degree of trapping of the reference window is output (S811). If NO in step S808, the trap determination unit 102 sets for determination in step S804 a threshold corresponding to a combination of the colors to be determined next (S809), switches the combination of the colors (S810), and returns the process to step S802. For example, when the color of interest is cyan, the reference colors are magenta, yellow, and black. Determination is performed for the three combinations; in other words, combinations of the color of interest and respective three colors.

The threshold for determination in step S804 changes in accordance with the combination of the colors. For example, for a combination of the color of interest and a reference color darker (thicker) than that, for example, a combination of cyan and black, a threshold (e.g., a threshold which allows trapping if at least one darker pixel is present) with which execution of trapping is more likely to be determined is set. On the other hand, for a combination of the color of interest and a reference color lighter (paler) than that of, for example, a combination of cyan and yellow, a threshold (e.g., a threshold which allows no trapping if at least one lighter pixel is present) with which execution of trapping is less likely to be determined is set. With this arrangement, a color change caused by overlap can be kept to a minimum. Note that, in general, from a visual viewpoint, the regions of the colors of cyan, magenta and yellow are aggressively extended, and the region of black is less aggressively extended since its extended region is noticeable.

Trap Color Decision Unit

The trap determination unit 102 determines the degree (necessity degree) of trapping necessity for a given pixel of interest of a given color of interest. Accordingly, the trap color decision unit 103 decides a trap color on the basis of the determination result (necessity degree) of the trap determination unit 102 and performs trapping. The value of a pixel to be trapped, the count value of surrounding pixels, the round length of the above scan, and the like are used as the determination parameters of a trap color. For example, when the pixel value around the pixel of interest is large (density is high) and the round length of the scan is small, the darker color is decided as a trap color. On the other hand, when the pixel value around the pixel of interest is small (density is low) and the round length of the scan is large, the lighter color is decided as a trap color. When the value of the trap color is smaller than that of the input pixel, no trapping is performed (no color lighter than the input is used).

Figure 10:
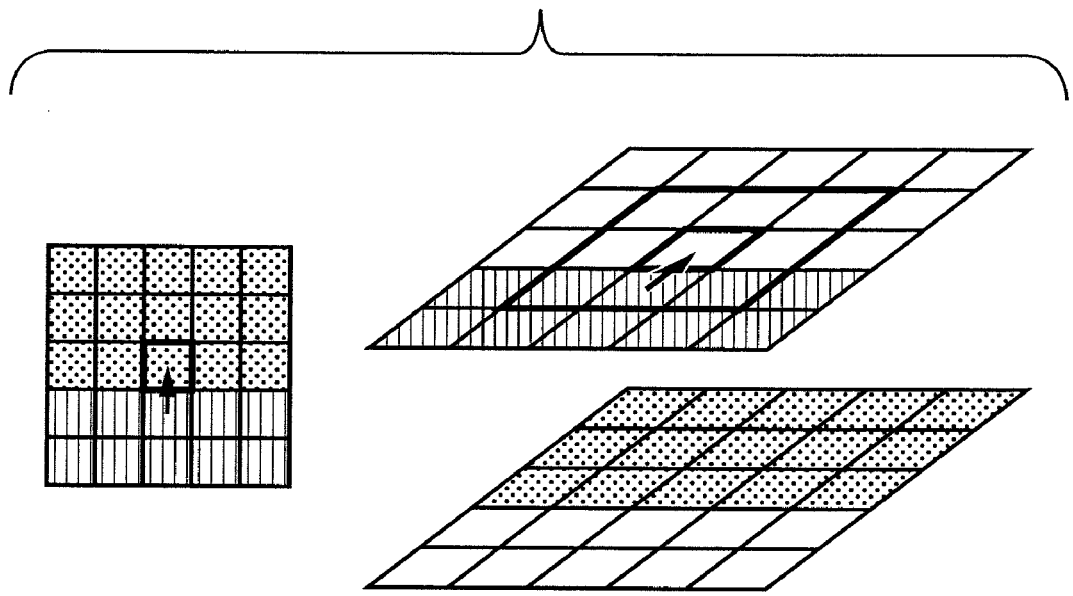
FIGS. 10 and 11 are views schematically illustrating a trap color decision.
Figure 11:
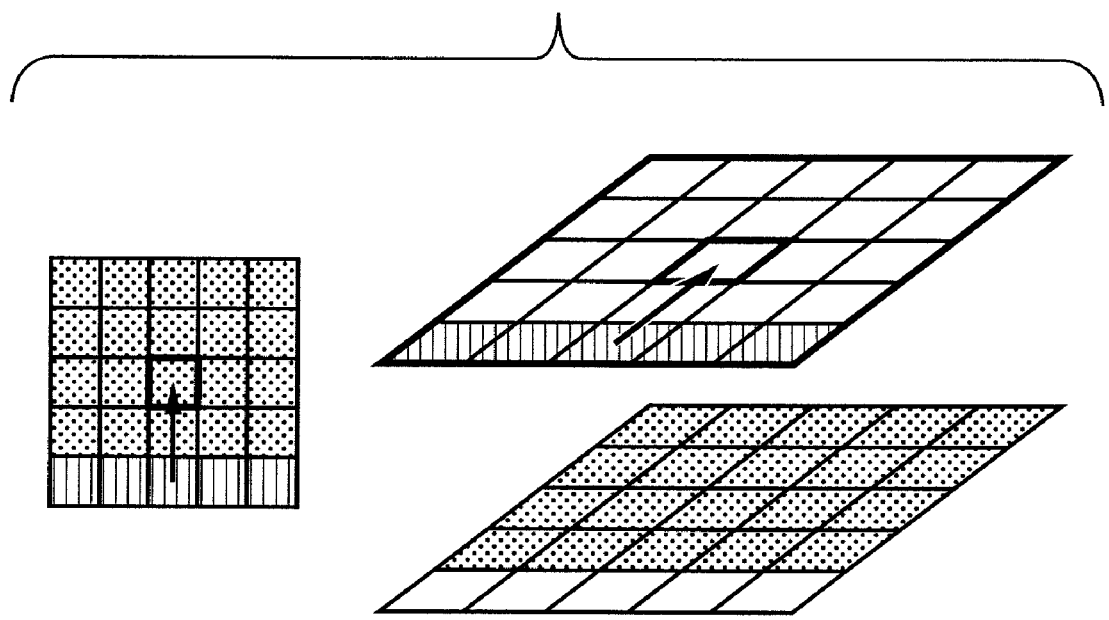

FIGS. 10 and 11 are views schematically illustrating a trap color decision.

Since the round length of the scan is small in FIG. 10, the darker color is decided as the trap color of the pixel of interest. On the other hand, since the round length of the scan is large in FIG. 11, the lighter color is decided as the trap color of the pixel of interest, as compared to the case shown in FIG. 10. The depth of the color visually changes in the edge portion of the image with gradation.

With this arrangement, the width of misregistration and the color change in the overlap portion are controlled. More specifically, when the misregistration width is large, the misregistration tolerance is increased by changing the color from the darker color with gradation. On the other hand, when the misregistration width is small, the color change is minimized by changing the color from the lighter color with gradation.

Spatial Filter Processing Unit

The spatial filter processing unit 104 performs filter processing for a reference window and a color of interest. The effect of edge enhancement or smoothing can be obtained depending on the setting of a filter coefficient. The spatial filter processing unit 104 performs filter processing and outputs a pixel value after the filter processing and a change (alienation degree, hereinafter) between an input pixel value and output pixel value.

Output Composition Unit

The output composition unit 105 inputs from the trap determination unit 102 the necessity degree as the determination result indicating whether to perform trapping and the degree of trapping if, in fact, trapping is determined to be performed. The output composition unit 105 also inputs the alienation degree of the input pixel value and output pixel value from the spatial filter processing unit 104. Based on these input information, the output composition unit 105 weights the output of the trap color decision unit 103 and that of the spatial filter processing unit 104 and calculates the final output pixel value.

For example, when the necessity degree indicates that trapping should be aggressively performed and the alienation degree is low, the output pixel value is decided by placing a priority on the output of the trap color decision unit 103. On the other hand, when the necessity degree indicates that trapping is to be less aggressively preformed, the output pixel value is decided by placing a priority on the output of the spatial filter processing unit 104. With this weighting process, trap/filter processing which suppresses a trouble caused by combining spatial filtering and trapping can be performed.

The output composition unit 105 has been described to weight and output a trap color and filter output. However, a selector operation may be performed in which the output of the trap color decision unit 103 is selected for a region wherein the determined necessity degree of trapping is high and the output of the spatial filter processing unit 104 is selected for a region wherein the necessity degree is low. That is, the output composition unit 105 may weight the outputs at a ratio of 0:1.0 and 1.0:0.

The values of the variety of parameters may be preset, but the value of the degree of trapping or that of filter strength may be set by a user using an operation panel of the image forming apparatus or an external device.

The reference window has been described as an N×N square. However, it may be an N×M rectangular with different longitudinal and latitudinal dimensions.

Second Embodiment

An image process of the second embodiment according to the present invention will be described below. Note that in the second embodiment, the same structures as in the first embodiment are denoted by the same reference numerals, and the detailed description thereof will not be repeated.

In the second embodiment, trap/filter processing is controlled based on the object attribute (text, picture, fine line, vector graphics, or the like) of a processing target pixel. Note that the object attribute may be determined by a CPU 1104 or image processing unit 1102, or the original image data and object attribute may be externally received.

Generally, trapping has little effect on an image typified by a picture image, and it is rarely performed for such an image in accordance with the process described in the first embodiment. However, when a picture image has a high-density sharp edge, unnecessary trapping may be performed for the edge of the picture image even though it is not preferable to perform a trapping process for such an edge. When the trap width in a fine text or fine line image is large, a trapped portion is more noticeable as compared to the width of the text or thin line, and this degrades the image quality of the printed material. In other words, when the degree (trap width or amount) of trapping and strength of spatial filter processing are controlled in accordance with the object attribute of an image, it is possible to minimize the adverse visual effects and improve the misregistration tolerance.

Figure 12:
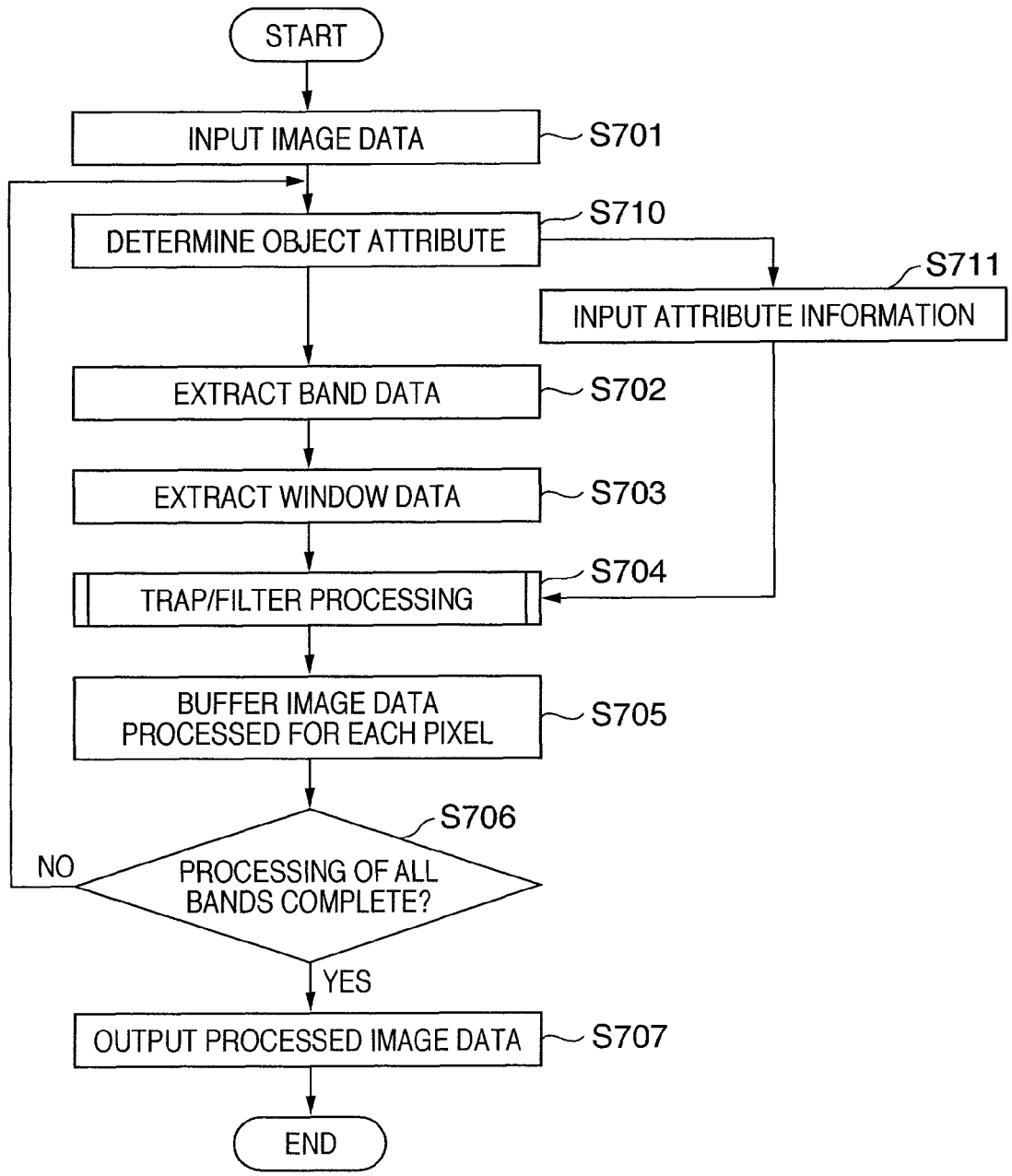
FIG. 12 is a flowchart for explaining edge processing of the second embodiment.

FIG. 12 is a flowchart for explaining edge processing of the second embodiment executed by the CPU 1104 and image processing unit 1102.

In addition to the edge processing of the first embodiment shown in FIG. 6, before extracting band data (S703), the object attribute at least for the band data is determined (S710), and the attribute information of the determination result is input to the trap/filter processing in S704 (S711). A rendering unit which renders a raster image from image data described in a description language such as a page description language determines the object attribute (S710). Of course, a specific image processing unit may be provided for determining the object attribute.

Figure 13:
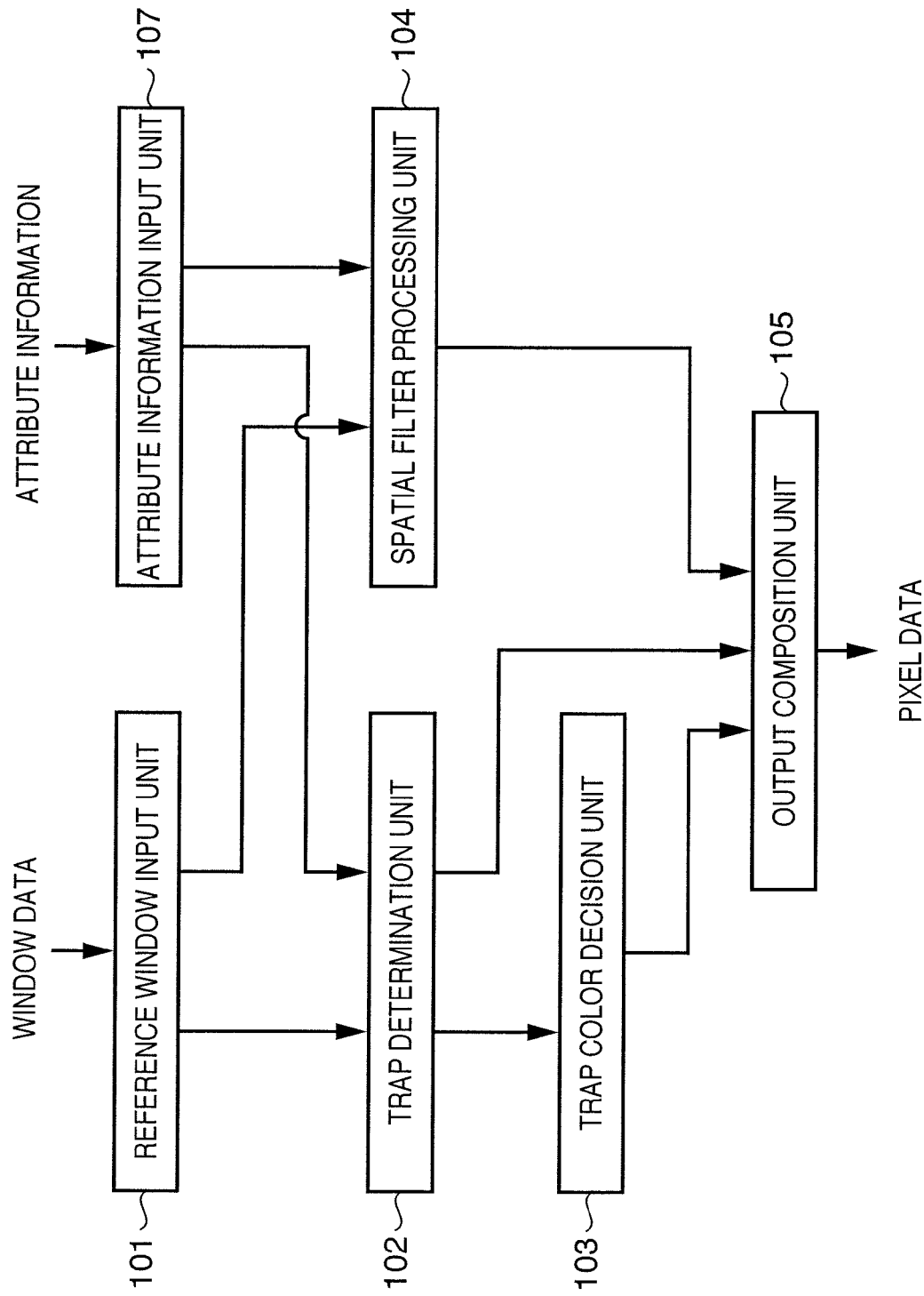
FIG. 13 is a block diagram showing another structure of the trap/filter processing unit.

FIG. 13 is a block diagram showing the structure of the trap/filter processing unit.

An attribute information input unit 107 inputs attribute information indicating the object attribution of a processing target pixel. A trap determination unit 102 and a spatial filter processing unit 104 refer to the object attribute of the pixel of a reference window and perform processing by switching a variety of parameters. Examples of the parameters are as follows.

The trap determination unit 102 switches a variety of thresholds such as the determination threshold of a dark pixel and that of a light pixel, maximum round length of a scan, and the like. Note that when the maximum round length is limited to be small, execution of trapping is more likely to be determined, and when the maximum round length is set large, the trap width becomes large. For example, for a small-point text attribute, thin line attribute, or the like, in order to make the overlap as small as possible, the parameter is switched such that execution of trapping is less likely to be determined. For the picture attribute, the parameter is switched such that trapping is determined not to be performed at all.

The spatial filter processing unit 104 is assumed to perform an edge enhancement process for the text attribute, thin line attribute, line drawing attribute, and the like and to perform smoothing for the picture attribute.

A trap color decision unit 103 is also assumed to use the attribute information to switch the control parameter of a trap color in accordance with the attribute. For example, for the small-point text attribute, the trap width is decreased but the dark color is caused to overlap.

Furthermore, an output composition unit 105 is also assumed to use the attribute information to switch the weight parameter in accordance with the attribute. With this arrangement, it is possible to switch balance between trapping and spatial filter processing in accordance with the attribute.

In this manner, when the process parameter is adaptively switched in accordance with the object attribute, more adaptive and flexible trapping can be performed in accordance with an image.

Third Embodiment

An image process of the third embodiment according to the present invention will be described below. Note that in the third embodiment, the same structures as in the first and second embodiments are denoted by the same reference numerals, and the detailed description thereof will not be repeated.

Trapping extends one color in an edge portion to make the colors overlap each other. In other words, the edge portion of an image becomes slightly blurred. That is, the same effect can be obtained by smoothing the pixel position determined to be trapped by a trap determination unit 102.

FIG. 14 is a block diagram showing the structure of a trap/filter processing unit which smoothes a pixel position determined to be trapped.

The trap color decision unit 103 and output composition unit 105 are eliminated from the structure of the trap/filter processing unit of the first embodiment shown in FIG. 7. A spatial filter processing unit 104 switches film parameters for the pixel determined to be trapped by the trap determination unit 102 and the pixel determined not to be trapped. With this arrangement, the pixel position to be trapped undergoes smoothing and the pixel position not to be trapped undergoes an edge enhancement process, and therefore the blank portion caused by misregistration can be corrected.

When the spatial filter processing unit 104 refers to not only the determination result indicating whether to perform trapping but also the degree of trapping and sets the strength of a filter parameter in accordance with the degree, more preferable smoothing can be performed. For example, a parameter to select smoothing is set when the degree of trapping is high (the necessity degree of misregistration correction is high), and a parameter to select edge enhancement is set when the degree of trapping is low (the necessity degree of misregistration correction is low).

Fourth Embodiment

An image process of the fourth embodiment according to the present invention will be described below. Note that in the fourth embodiment, the same structures as in the first to third embodiments are denoted by the same reference numerals, and the detailed description thereof will not be repeated.

Figure 15:
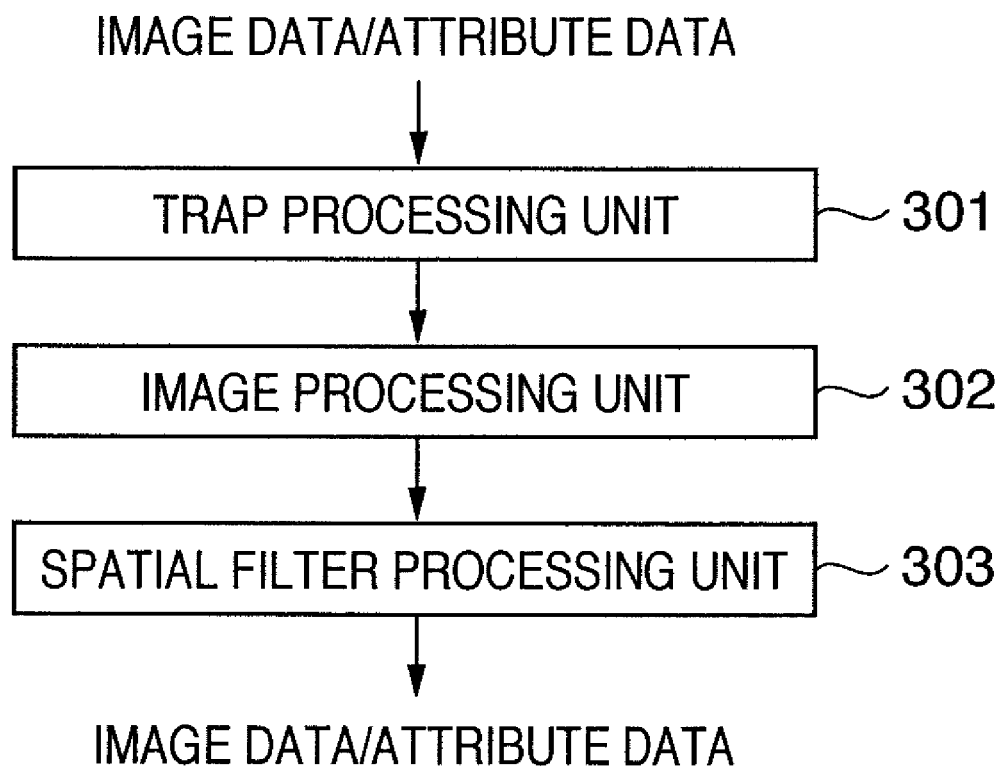
FIG. 15 is a block diagram for explaining the process flow of the fourth embodiment.

FIG. 15 is a block diagram for explaining the process flow of the fourth embodiment. In the process flow shown in FIG. 15, spatial filter processing is performed after a trapping process.

A trap processing unit 301 performs a trapping process for a pixel determined to be trapped. The trap processing unit 301 then adds, as one of the object attributes, a trap process attribute "trapped" to the pixel which underwent the trap process. The trap processing unit 301 adds a trap process attribute "untrapped" to the pixel which did not undergo the trap process.

The image output from the trap processing unit 301 undergoes other image processes by an image processing unit 302, and then is input to a spatial filter processing unit 303.

The spatial filter processing unit 303 determines the trap process attribute and switches filter processing for the region to be trapped and that not to be trapped. More specifically, if edge enhancement is performed for a trap-processed pixel, the image quality of the edge portion degrades. Accordingly, for a trapped pixel, a filter which enhances the edge a little is applied. On the other hand, for an untrapped pixel, a filter which strongly enhances the edge is applied because the image quality degradation of the edge portion need not be considered in this case.

The trap processing unit 301 can add not a trap process attribute which indicates whether a trap process has been performed in binary values but a trap process attribute which indicates the degree of performed trap process in multilevel attribute values. In this case, it is possible to switch a spatial filter in stages (e.g., the degree of edge enhancement in stages) in accordance with the trap degree.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-238172, filed Sep. 1, 2006, which is hereby incorporated by reference herein in its entirety.

What is claimed is:

1. An image processing apparatus comprising:
an input section, arranged to input image data;
a determining section, arranged to determine a degree of necessity of trapping at a position of a pixel of interest of the input image data;
a trapping section, arranged to perform trapping for the input image data;
an edge-enhancement section, arranged to perform edge-enhancement processing for a pixel of interest of the input image data; and
an output section, arranged to calculate image data to be output by weighting an output of the trapping section and an output of the edge-enhancement section in accordance with the degree of necessity determined by the determining section,
wherein the determining section comprises:
a first counting section configured to count dark pixels by scanning a periphery of a pixel of interest;
a second counting section configured to count light pixels by scanning a periphery of the pixel of interest; and
a deciding section configured to decide, based on a count value of the dark pixels
of the first counting section and a count value of the light pixels of the second counting section, whether to further count the dark pixels and the light pixels by the first and second counting sections while extending a region of the scan, or to output a result of the determination including the degree of necessity, and
wherein the deciding section determines to perform the trapping for a position of the pixel of interest in a case where the count value of the dark pixels and the count value of the light pixels are equal to or larger than a predetermined threshold, and determines not to perform the trapping for a position of the pixel of interest in a case where a region of the scan exceeds a predetermined window region while the count value of the dark pixels and the count value of the light pixels are smaller than the threshold.

2. The apparatus according to claim 1, wherein the edge-enhancement section outputs an alienation degree indicating a degree of change of image data before and after the edge-enhancement processing, and said output section performs the weighting in accordance with the degree of necessity and the alienation degree.

3. The apparatus according to claim 1, wherein the deciding section extends a region of the scan pixel by pixel.

4. A method of processing an image comprising:
using a processor to perform the steps of:
inputting image data;
determining a degree of necessity of trapping at a position of a pixel of interest of the input image data;
performing trapping for the input image data;
performing edge-enhancement processing for a pixel of interest of the input image data; and
calculating image data to be output by weighting an output of the trapping and an output of the edge-enhancement processing in accordance with the degree of necessity determined in the determining step,
wherein, the determining step comprises:
counting dark pixels by scanning a periphery of a pixel of interest;
counting light pixels by scanning a periphery of the pixel of interest; and
deciding, based on a count value of the dark pixels of the first counter and a count
value of the light pixels of the second counter, whether to further count the dark pixels and the light pixels in the first and second counting steps while extending a region of the scan, or to output a result of the determination including the degree of necessity, and
wherein, in the deciding step, it is determined that the trapping for a position of the pixel of interest is performed in a case where the count value of the dark pixels and the count value of the light pixels are equal to or larger than a predetermined threshold, and it is determined that the trapping for a position of the pixel of interest is not performed in a case that a region of the scan exceeds a predetermined window region while the count value of the dark pixels and the count value of the light pixels are smaller than the threshold.

5. A computer-executable program stored in a non-transitory computer-readable medium comprising a computer-executable program for causing a computer to perform a method of processing an image, the method comprising the steps of:
inputting image data;
determining a degree of necessity of trapping at a position of a pixel of interest of the input image data;
performing trapping for the input image data;
performing edge-enhancement processing for a pixel of interest of the input image data; and
calculating image data to be output by weighting an output of the trapping and an output of the edge-enhancement processing in accordance with the degree of necessity determined in the determining step,
wherein, the determining step comprises:
counting dark pixels by scanning a periphery of a pixel of interest;
counting light pixels by scanning a periphery of the pixel of interest; and
deciding, based on a count value of the dark pixels of the first counter and a count
value of the light pixels of the second counter, whether to further count the dark pixels and the light pixels in the first and second counting steps while extending a region of the scan, or to output a result of the determination including the degree of necessity, and
wherein, in the deciding step, it is determined that the trapping for a position of the pixel of interest is performed in a case where the count value of the dark pixels and the count value of the light pixels are equal to or larger than a predetermined threshold, and it is determined that the trapping for a position of the pixel of interest is not performed in a case that a region of the scan exceeds a predetermined window region while the count value of the dark pixels and the count value of the light pixels are smaller than the threshold.

6. A non-transitory computer-readable medium storing a computer-executable program for causing a computer to perform a method of processing an image, the method comprising the steps of:
inputting image data;
determining a degree of necessity of trapping at a position of a pixel of interest of the input image data;
performing trapping for the input image data;
performing edge-enhancement processing for a pixel of interest of the input image data; and
calculating image data to be output by weighting an output of the trapping and an output of the edge-enhancement processing in accordance with the degree of necessity determined in the determining step, wherein, the determining step comprises:

counting dark pixels by scanning a periphery of a pixel of interest;

counting light pixels by scanning a periphery of the pixel of interest; and deciding, based on a count value of the dark pixels of the first counter and a count value of the light pixels of the second counter, whether to further count the dark pixels and the light pixels in the first and second counting steps while extending a region of the scan, or to output a result of the determination including the degree of necessity, and wherein, in the deciding step, it is determined that the trapping for a position of the pixel of interest is performed in a case where the count value of the dark pixels and the count value of the light pixels are equal to or larger than a predetermined threshold, and it is determined that the trapping for a position of the pixel of interest is not performed in a case that a region of the scan exceeds a predetermined window region while the count value of the dark pixels and the count value of the light pixels are smaller than the threshold.

* * * * *